United States Patent
Honma

(10) Patent No.: US 8,086,704 B2
(45) Date of Patent: Dec. 27, 2011

(54) PROJECTOR SELECTION SYSTEM, PROJECTOR SELECTION METHOD, AND PROGRAM FOR IMPLEMENTING THE SYSTEM AND METHOD

(75) Inventor: Kazuya Honma, Tokyo (JP)

(73) Assignee: NEC Viewtechnology, Ltd, Tokyo (JP)

( * ) Notice: Subject to any disclaimer, the term of this patent is extended or adjusted under 35 U.S.C. 154(b) by 0 days.

(21) Appl. No.: 12/897,881

(22) Filed: Oct. 5, 2010

(65) Prior Publication Data
US 2011/0082903 A1 Apr. 7, 2011

Related U.S. Application Data

(62) Division of application No. 11/016,868, filed on Dec. 21, 2004, now abandoned.

(30) Foreign Application Priority Data

Jan. 21, 2004 (JP) .................................. 2004-013083

(51) Int. Cl.
*G06F 15/177* (2006.01)
(52) U.S. Cl. ............ 709/220; 709/224; 345/9; 348/744; 353/94
(58) Field of Classification Search .................. 709/204, 709/220, 224; 345/9; 348/744; 353/94
See application file for complete search history.

(56) References Cited

U.S. PATENT DOCUMENTS

| | | |
|---|---|---|
| 6,581,094 B1 | 6/2003 | Gao |
| 2001/0038392 A1 | 11/2001 | Humpleman et al. |
| 2002/0036652 A1 | 3/2002 | Masumoto et al. |
| 2003/0048356 A1 | 3/2003 | Kohno et al. |
| 2004/0227900 A1 | 11/2004 | Sato et al. |
| 2004/0255029 A1 | 12/2004 | Manion et al. |
| 2005/0007561 A1 | 1/2005 | Koyama et al. |
| 2005/0135583 A1 | 6/2005 | Kardos |
| 2006/0008175 A1 | 1/2006 | Tanaka et al. |
| 2006/0033884 A1 | 2/2006 | Sato |
| 2006/0038743 A1 | 2/2006 | Cambron |
| 2007/0268391 A1 | 11/2007 | Kuroiwa |

FOREIGN PATENT DOCUMENTS

| | | |
|---|---|---|
| JP | 08-172676 | 7/1996 |
| JP | 2000-112691 A | 4/2000 |
| JP | 2002-196740 A | 7/2002 |
| JP | 2003-018676 | 1/2003 |
| JP | 2003-044473 | 2/2003 |
| JP | 2003-098594 | 4/2003 |
| JP | 2003-296351 | 10/2003 |
| JP | 2003-308312 | 10/2003 |
| WO | WO-03/100620 A1 | 12/2003 |

OTHER PUBLICATIONS

Tom Williams et al., "Java perks developer interest from IS to embedded system," Computer Design, May 1996, vol. 35, No. 6, pp. 32-34 and 37.
Ken Arnold, "The Jini Architecture: Dynamic Services in a Flexible Network," Design Automation, 36th Annual Conference on New Orleans, LA, Jun. 1999 pp. 157-162.
J. Allard, et al., "Jini Meets UpnP: An Architecture for Jini/UpnP Interoperability," 2003 Symposium on Applications and the Internet, pp. 268-275.
Chas Honton, "Services Discovery Protocol," Secant Technologies, Dec. 1997, pp. 1-4.

*Primary Examiner* — Faruk Hamza
*Assistant Examiner* — Oleg Survillo
(74) *Attorney, Agent, or Firm* — Dickstein Shapiro LLP

(57) ABSTRACT

A projector selection system selects one of projectors from a computer which is connected to the projectors through a network. An identifier is displayed on each of the projectors by identifier assigning means and identifier display means. A preview image, which is a scale-down version of an image displayed on the screen by the projector, is acquired by preview image generating means and preview image transmitting means. The preview image is displayed on a dialog display area on the screen of the computer.

2 Claims, 6 Drawing Sheets

Fig. 1 (Prior Art)
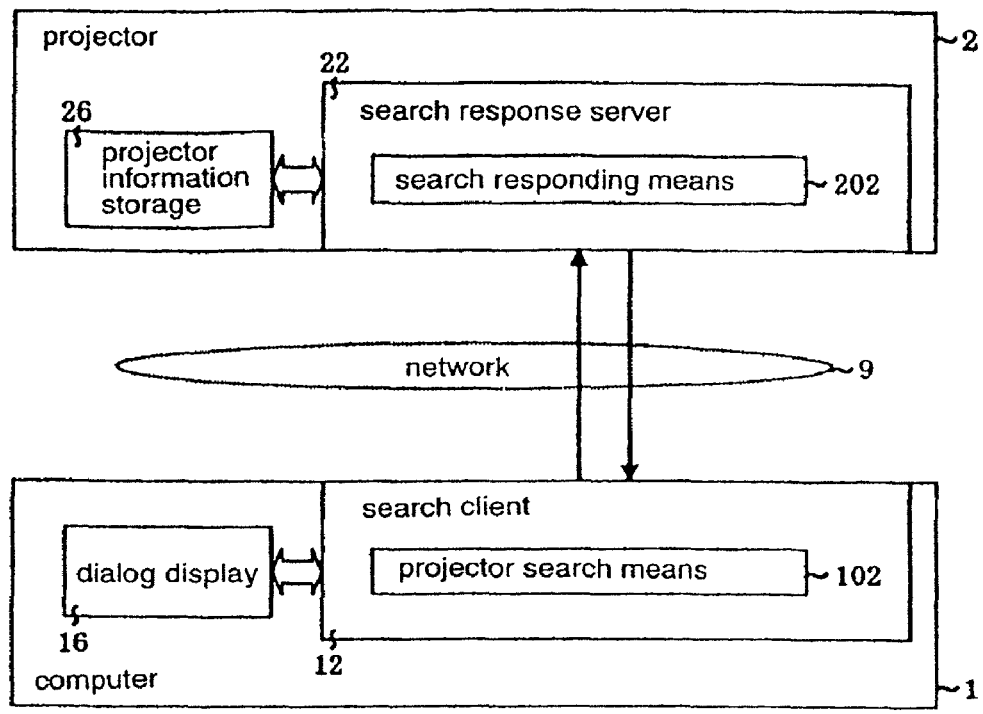
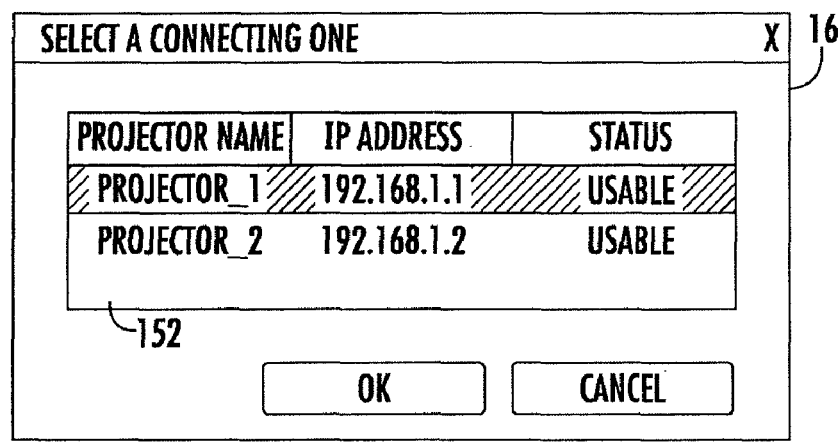
FIG. 2
*PRIOR ART*

Fig.5
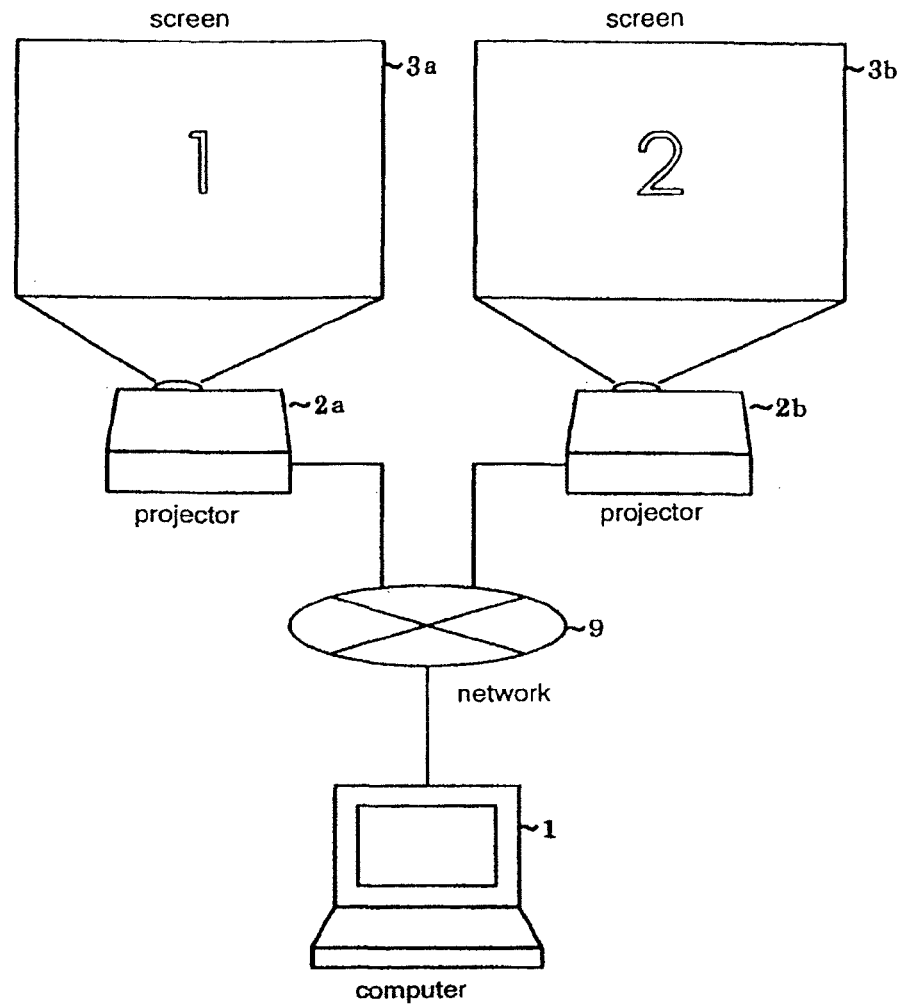
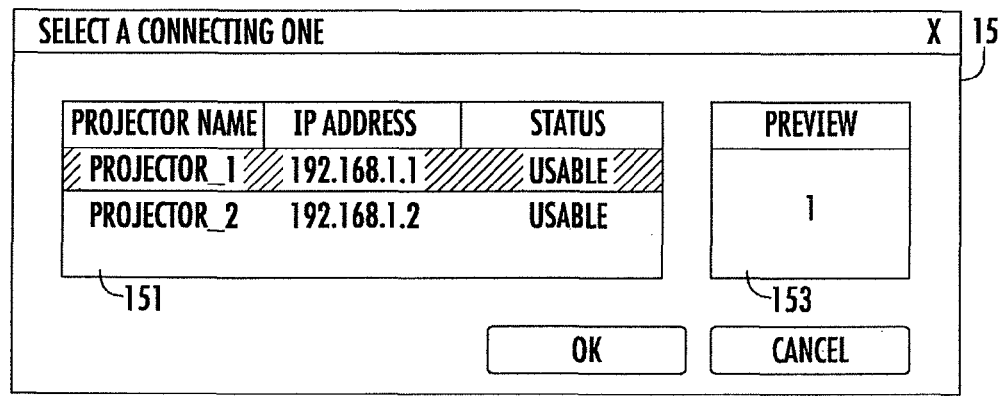
FIG. 6

US 8,086,704 B2

PROJECTOR SELECTION SYSTEM, PROJECTOR SELECTION METHOD, AND PROGRAM FOR IMPLEMENTING THE SYSTEM AND METHOD

CROSS REFERENCE TO RELATED APPLICATION

This application is a Divisional of U.S. application Ser. No. 11/016,868, filed Dec. 21, 2004, which is hereby incorporated by reference.

BACKGROUND OF THE INVENTION

1. Field of the Invention

The present invention relates to a projector selection system, a projector selecting method, and a program for implementing the system and method.

2. Description of the Related Art

For connecting a computer to an intended projector through a network, a search system is used for purposes of avoiding burdensome entry of the IP address and the like of the projector. For example, there is a communication controller for individually controlling a multi-projector to which a plurality of projectors are connected (see JP-08-172676-A).

The configuration of the search system comprises search client 12 having means 102 for searching for a projector, and having access to dialog display 16; and search response server 22 having means 202 for responding to a search and having access to information from projector information storage 26, as illustrated in FIG. 1. Information on a particular projector is acquired by the search system, and displayed on the screen of a computer in the form of projector list 152, as illustrated in FIG. 2.

Conventionally, when a plurality of available projectors are found on a network, a list of retrieved projectors alone is not sufficient for a user to know which item supports which projector for selecting a projector to be employed from the foregoing projector list.

In addition, for associating items on the computer screen with actual projectors, the user must have previously operated the projectors to know the names, IP addresses, and the like. Thus, the conventional search system fails to provide a high usability.

From the reasons as set forth above, a method has been desired for permitting the user to readily identify one of retrieved projectors.

SUMMARY OF THE INVENTION

It is an object of the present invention to provide a projector selection system for facilitating a selection of a projector, a projector selecting method, and a program for implementing the system and method.

A projector selection system according to the present invention has one or more projectors and a computer interconnected through a network for selecting one of the projectors from the computer. The computer comprises a search client and a dialog display, while the projector comprises a search response server and a projector information storage. The search client includes projector search means for transmitting a search command for searching the projectors to the network, and acquiring projector information including a projector name, an IP address, and a status from the projector information storage as a response to the search command from the projector; identifier assigning means for generating a unique identifier for the projector which has responded, transmitting an identifier assignment for assigning the identifier to each of the projectors through the network, and omitting the transmission of the identifier assignment to the projector which has already displayed an image; and preview image requesting means for transmitting an image request command to the network for requesting a preview image which is a scale-down version of an image displayed by the projector on a screen, and acquiring the preview image as a response to the image request command from the projector. The dialog display includes means for displaying the projector information and the preview image. The projector information storage includes means for preserving the projector information. The search response server includes search response means for receiving the search command from the network, and returning the projector information from the projector information storage; display presence/absence checking means for checking the status indicating whether or not the display has already displayed an image; identifier display means for displaying the identifier received from the network on a screen; preview image generating means for generating the preview image based on the displayed identifier or an existing display; and preview image transmitting means for receiving the image request command from the network, and returning the preview image generated by the preview image generating means.

Another projector selection system according to the present invention has one or more projectors and a computer interconnected through a network for selecting one of the projectors from the computer. The computer comprises a search client and a dialog display, while the projector comprises a search response server and a projector information storage. The search client includes projector search means for transmitting a search command for searching the projectors to the network, and acquiring projector information including a projector name, an IP address, and a status from the projector information storage as a response to the search command from the projector; and preview image requesting means for transmitting an image request command to the network for requesting a preview image which is a scale-down version of an image displayed by the projector on a screen, and acquiring the preview image as a response to the image request command from the projector. The dialog display includes means for displaying the projector information and the preview image. The projector information storage includes means for preserving the projector information. The search response server includes search response means for receiving the search command from the network, and returning the projector information from the projector information storage; display presence/absence checking means for checking the status indicating whether or not the display has already displayed an image; IP address display means responsive to the search command received from the network for displaying the IP address set for the projector on a screen, and omitting the display of the IP address of the projector which has already displayed an image on the screen; preview image generating means for generating the preview image based on the displayed IP address or an existing display; and preview image transmitting means for receiving the image request command from the network, and returning the preview image generated by the preview image generating means.

A program according to the present invention causes the computer and the search response server of the projector to function as any of the projector selection systems described above.

A projector selecting method according to the present invention is provided for selecting one of projectors from a computer, wherein the projectors and computer are interconnected through a network, the computer comprises a search client and a dialog display, and the projector comprises a search response server and a projector information storage. The method comprises the steps of the search client transmitting a search command for searching the projectors to the network using projector search means, and waiting for a response to the search command; the search response server receiving the search command, reading a projector name and an IP address from the projector information storage, acquiring a status indicative of the presence or absence of a display from display presence/absence checking means, and returning projector information including the projector name, IP address and status, using search response means; the search client passing the received projector information to the dialog display for displaying the projector information on a screen; the search client generating a unique identifier for each of the projectors which have responded, transmitting an identifier assignment to each of the projectors for assigning the identifier, and omitting the transmission of the identifier to the projector which has already displayed an image; the search response server receiving the identifier assignment, displaying the identifier on a screen using identifier displaying means, and returning an assignment completion; the search response server generating a preview image which is a scale-down version of an image displayed on the screen by the projector using preview image generating means based on the displayed identifier or an existing display; the search client, responding to a selection of a desired projector made on the dialog display, and transmitting an image request command for requesting the preview image using preview image requesting means; the search response server receiving the image request command, and transmitting the generated preview image as image data using preview image transmitting means; and the search client passing the received image data to the dialog display for displaying the preview image on the screen.

Another projector selecting method according to the present invention is provided for selecting one of projectors from a computer, wherein the projectors and computer are interconnected through a network, the computer comprises a search client and a dialog display, and the projector comprises a search response server and a projector information storage. The method comprising the steps of the search client transmitting a search command for searching the projectors to the network using projector search means, and waiting for a response to the search command; the search response server receiving the search command, reading a projector name and an IP address from the projector information storage, acquiring a status indicative of the presence or absence of a display from display presence/absence checking means, and returning projector information including the projector name, IP address and status, using search response means; the search client passing the received projector information to the dialog display for displaying the projector information on a screen; the search response server receiving the search command, displaying the IP address set for the projector on a screen using IP address display means, and omitting the display of the IP address for the projector which has already displayed an image on the screen; the search response server generating a preview image which is a scale-down version of an image displayed on the screen by the projector using preview image generating means based on the displayed IP address or an existing display; the search client, responding to a selection of a desired projector made on the dialog display, and transmitting an image request command for requesting the preview image using preview image requesting means; the search response server receiving the image request command, and transmitting the generated preview image as image data using preview image transmitting means; and the search client passing the received image data to the dialog display for displaying the preview image on the screen.

A program according to the present invention causes the computer and the search response server of the projector to execute any of the projector selecting methods described above.

The present invention provides various advantages, some of which are described below. The present invention permits the user to readily select an appropriate projector because the user is provided with the preview images which associate items on a projector list displayed on the computer screen with actual projectors. Also, the present invention does not prevent other persons from using projectors since the identifiers or IP addresses are not displayed for those projectors which have already made a display. Additionally, the identifier assigning means can be omitted from the search client when using an IP address unique to each projector.

BRIEF DESCRIPTION OF THE DRAWINGS

FIG. 1 is a block diagram illustrating the configuration of a conventional search system;

FIG. 2 is a diagram illustrating a display on a conventional computer screen;

FIG. 5 is a diagram illustrating how identifiers are displayed on screens;

FIG. 6 is a diagram showing a display layout on a screen of a dialog display;

DETAILED DESCRIPTION OF THE PREFERRED EMBODIMENTS

First Embodiment of the Present Invention

A first embodiment of the present invention will be described in regard to the configuration in detail with reference to the accompanying drawings.

Figure 3:
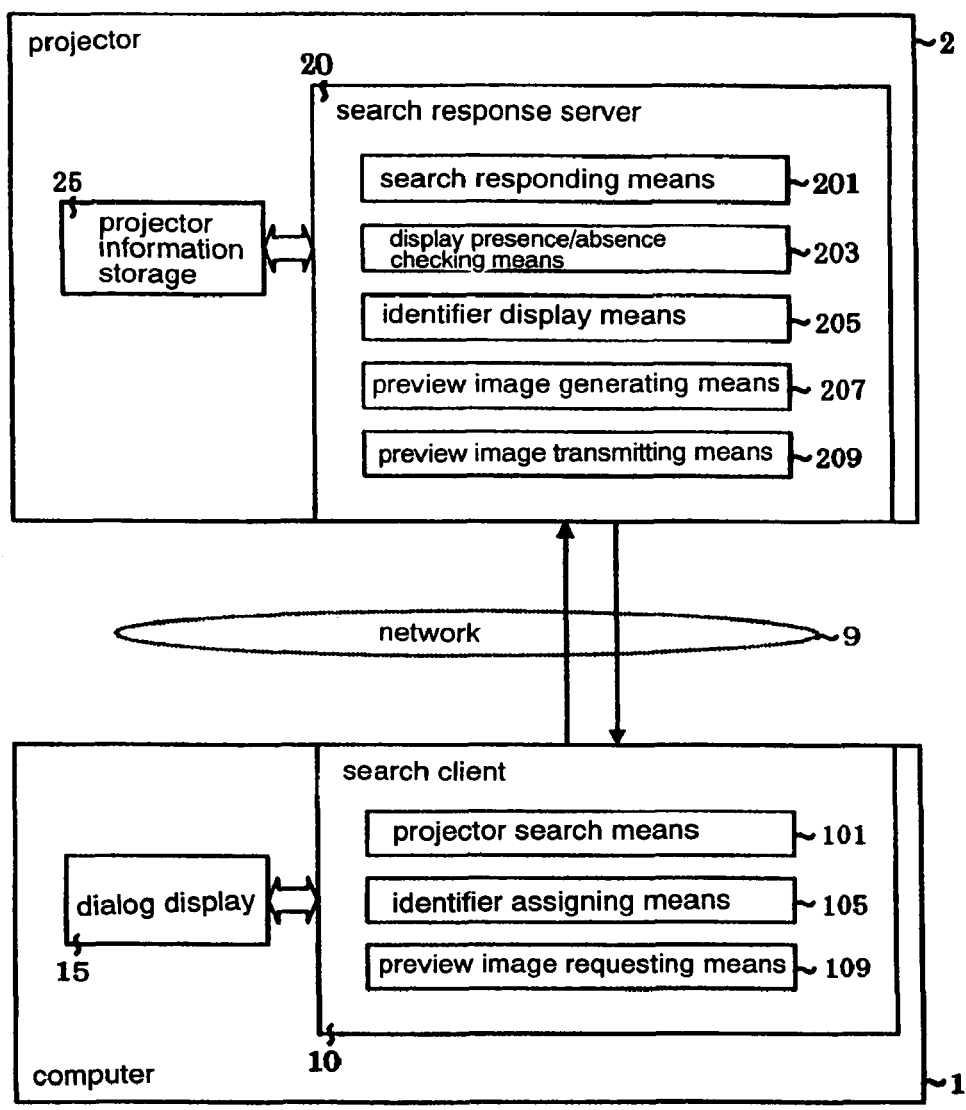
FIG. 3 is a block diagram illustrating the configuration of a projector selection system according to a first embodiment of the present invention.

Referring to FIG. 3, the first embodiment of the present invention comprises a projector selection system which has one or more projectors 2 and computer 1 that are interconnected through network 9 for selecting projector 2 from computer 1.

Computer 1 comprises search client 10 having projector search means 101, identifier assigning means 105, and preview image requesting means 109; and dialog display 15.

Projector 2 in turn comprises search response server 20 having search responding means 201, display presence/absence checking means 203, identifier display means 205, preview image generating means 207, and preview image transmitting means 209; and projector information storage 25.

Each of the foregoing means generally operate in the following manner.

First, in computer 1, projector search means 101 transmits a search command to network 9 for searching projectors, and acquires projector information including a projector name, an IP address, status, and the like from projector information storage 25 as a response to a search command from each projector 2. Identifier assigning means 105 generates a unique identifier for each of projectors 2 which have responded, and transmits an identifier assignment for assigning the identifier to each of projectors 2 through network 9. Identifier assigning means 105 does not transmit the identifier assignment to projectors 2 which have already made a display. Preview image requesting means 109 transmits an image request command to network 9 for requesting a preview image which is a scale-down version of an image displayed by projector 2 on the screen, and acquires the preview image as a response to the image request command from projector 2. Dialog display 15 visually provides the user with projector information and preview images which make up a user interface.

Next, in projector 2, search response means 201 receives a search command from network 9, and returns the projector information including the projector name, IP address, status, and the like. Display presence/absence checking means checks the status indicating whether projector 2 has already made any display. Identifier display means 205 displays an identifier received from network 9 on the screen. Preview image generating means 207 generates a preview image, based on the displayed identifier or an existing display, which is a scaled-down version of an image displayed on the screen by projector 2. Preview image transmitting means 209 receives an image request command from network 1, and returns the preview image generated by preview image generating means 207. Projector information storage 25 preserves the projector information including the projector name, IP address, status, and the like in a storage device or a memory.

A program for implementing the projector selection system according to the first embodiment of the present invention can cause the computer and the search response server of the projector to function as the projector selection system.

Figure 4:
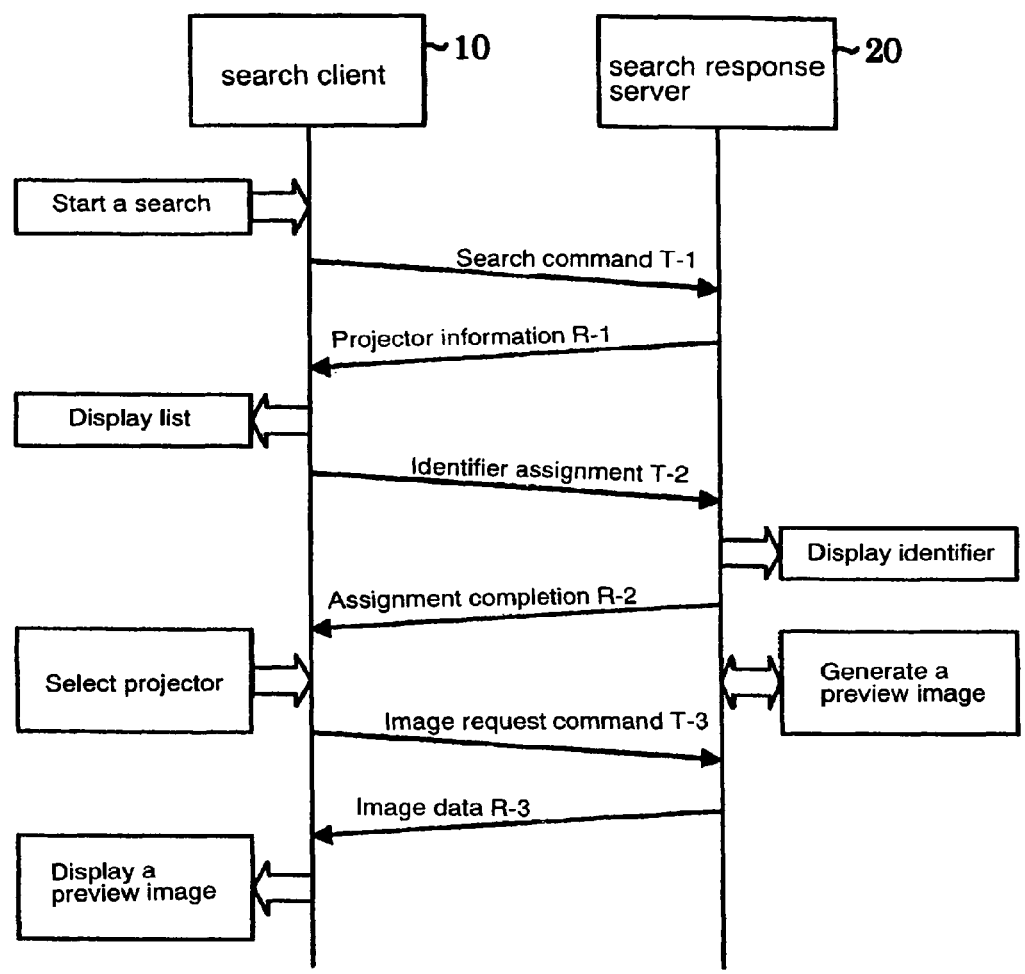
FIG. 4 is a sequence chart for describing the operation according to the first embodiment of the present invention.

Next, the operation according to the first embodiment of the present invention will be described in detail with reference to FIG. 3 and a sequence chart of FIG. 4.

As the program starts a search, search client 10 transmits search command T-1 for searching for projectors 2 to network 9 using projector search means 101, and waits for a response to search command T-1.

Search response server 20, upon receipt of search command T-1, reads the projector name, IP address, and the like from projector information storage 25, while acquiring the status indicating whether or not projector 2 is making a display on the screen from display presence/absence checking means 203, and returns projector information R-1 including the projector name, IP address and status, using search response means 201.

Search client 10 passes the received projector information to dialog display 15 for displaying the projector information on the screen (see projector list 151 in FIG. 6 for a specific example).

Search client 10 next generates a unique identifier (a character string comprised of alphanumeric symbols) for each of projectors 2 which have responded, and transmits identifier assignment T-2 for assigning the identifier to each projector 2. However, identification assignment T-2 is not transmitted to projector 2 which has already made a display.

Search response server 20, upon receipt of identifier assignment T-2, displays the identifier on the screen (see screens 3a, 3b in FIG. 5 for specific examples) using identifier display means 205, and returns assignment completion R-2.

Search response server 20 further generates a preview image which is a scale-down version of the image displayed on the screen by projector 2 based on the displayed identifier or an existing display using preview image generating means 207.

Afterwards, when projector 2 is selected on dialog display 15, search client 10 transmits image request command T-3 for requesting a preview image using preview image requesting means 109.

Search response server 20, upon receiving image request command T-3, returns the generated preview image as image data R-3 using preview image transmitting means 209.

Search client 10 passes the received image data to dialog display 15 for displaying the preview image on the screen (see preview image 153 in FIG. 6 for a specific example).

A program for implementing the projector selecting method according to the first embodiment of present invention can permit the computer and the search response server of the projector to execute the projector selecting method.

Second Embodiment of the Present Invention

A second embodiment of the present invention will be described in regard to the configuration in detail with reference to the accompanying drawings.

Figure 7:
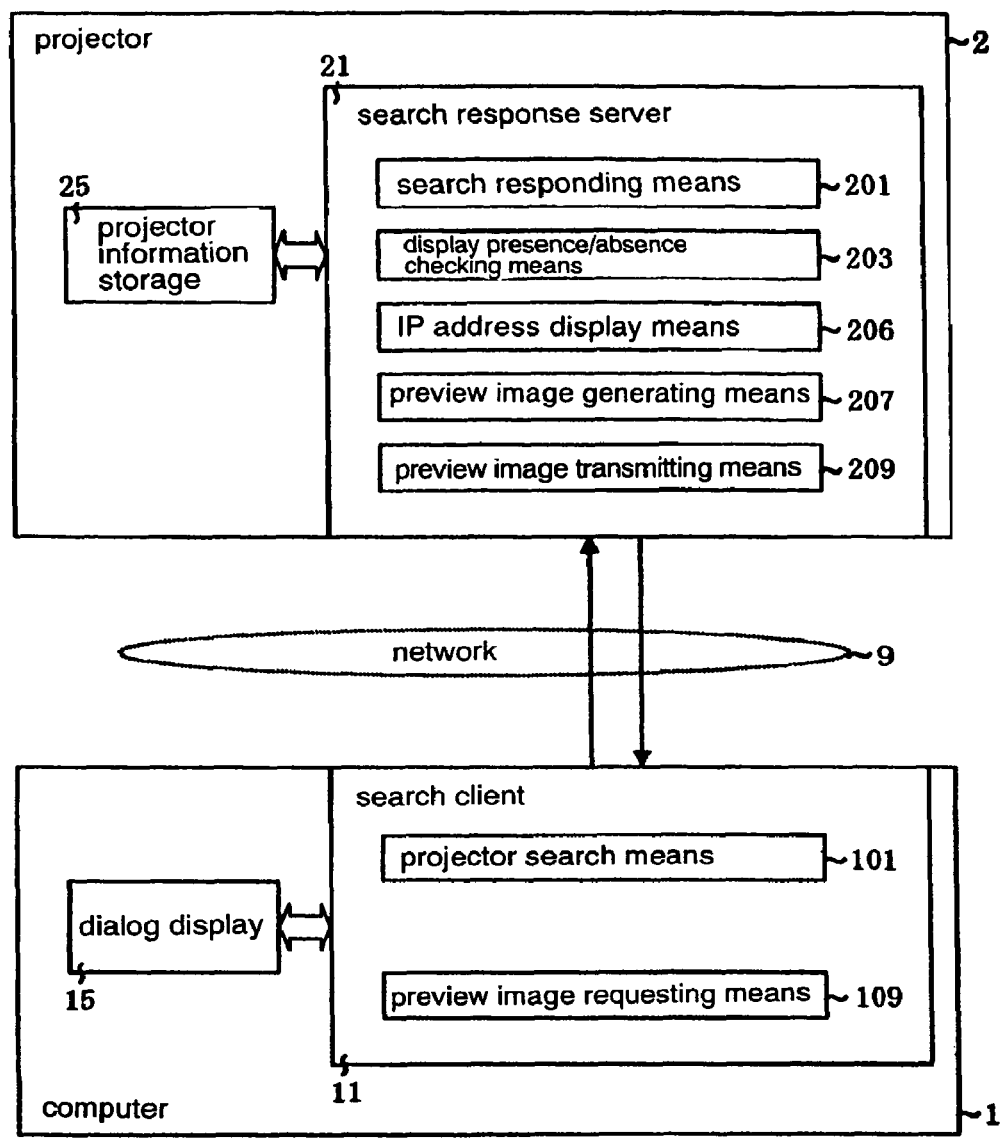
FIG. 7 is a block diagram illustrating the configuration of a projector selection system according to a second embodiment of the present invention.

Referring to FIG. 7, the second embodiment of the present invention comprises a projector selection system which has one or more projectors 2 and computer 1 that are interconnected through network 9 for selecting projector 2 from computer 1 in a manner similar to the first embodiment.

However, the second embodiment of the present invention differs from the first embodiment in that identifier assigning means 105 is removed, and identifier display means 205 is replaced with IP address display means 206.

Computer 1 comprises search client 11 having projector search means 101 and preview image requesting means 109; and dialog display 15.

Projector 2 in turn comprises search response server 21 having search response means 201, display presence/absence checking means 203, IP address display means 206, preview image generating means 207, and preview image transmitting means 209; and projector information storage 25.

Each of the foregoing means generally operates in the following manner.

First, in computer 1, projector search means 101 transmits a search command to network 9 for searching for projectors 2, and acquires projector information including the projector name, IP address, status, and the like as a response from each projector 2. Preview image requesting means 109 transmits an image request command to network 9 for requesting a preview image which is a scale-down version of an image displayed on the screen by projector 2, and acquires the preview image as a response to the image request command from projector 2. Dialog display 15 visually provides the user with he projector information and preview image which make up a user interface.

Next, in projector 2, search response means 201 receives the search command from network 9, and returns the projector information including the projector name, IP address, and the like. Display presence/absence checking means 203 checks the status indicating whether projector 2 has already made any display. IP address display means 206, upon receipt of a search command from network 9, displays the IP address set for projector 2 on the screen, but does not display the IP address of projector 2 if it has already made a display. Preview image generating means 207 generates a preview image which is scale-down version of an image displayed on the screen by projector 2 based on the displayed IP address or an existing display. Preview image transmitting means 209 receives an image request command from network 9, and returns the preview image generated by preview image generating means 207. Projector information storage 25 preserves the projector information including the projector name, IP address, status, and the like in a storage device or a memory.

A program for implementing the projector selection system according to the second embodiment of the present invention can cause the computer and the search response server of the projector to function as the projector selection system.

Figure 8:
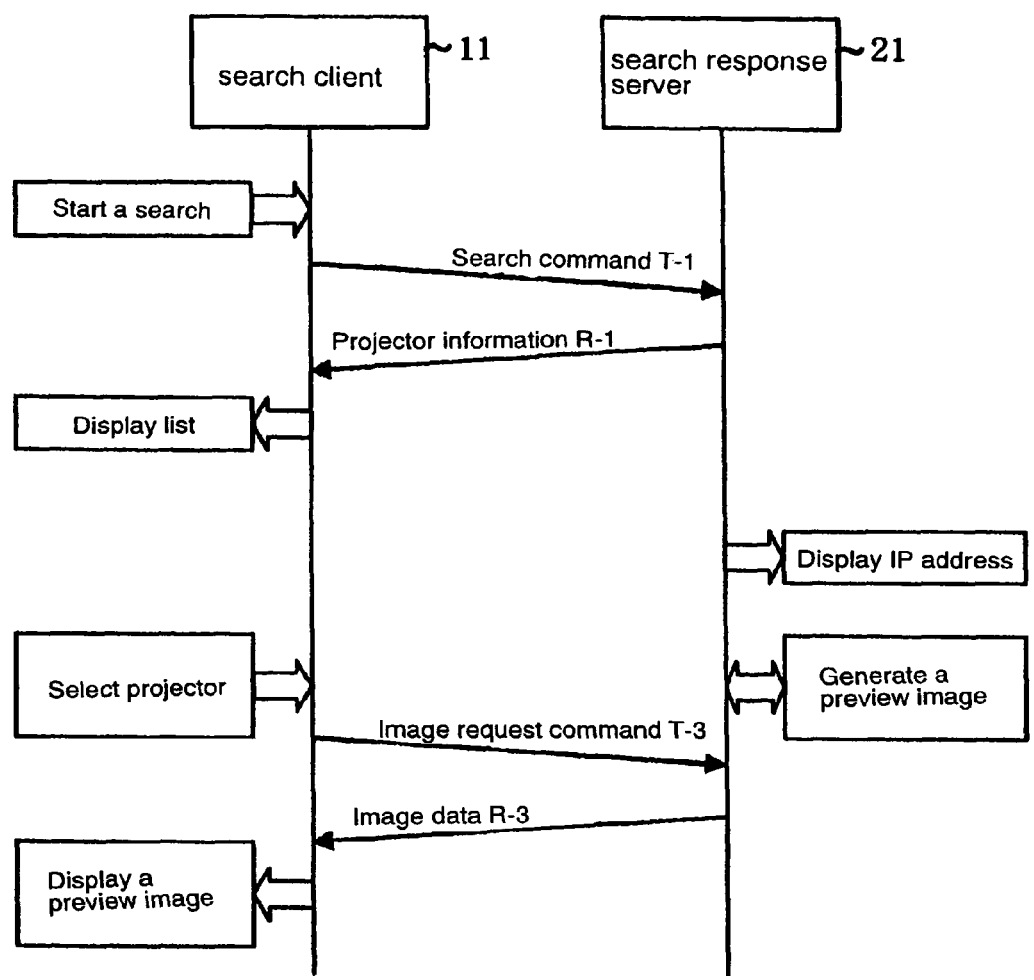
FIG. 8 is a sequence chart for describing the operation according to the second embodiment of the present invention.

Next, the operation according to the second embodiment of the present invention will be described in detail with reference to FIG. 7 and a sequence chart of FIG. 8.

As the program starts a search, search client 11 transmits search command T-1 for searching projectors 2 to network 9 using projector searching means 101, and waits for a response to search command T-1.

Search response server 21, upon receipt of search command T-1, reads the projector name, IP address, and the like from projector information storage 25, while acquiring the status indicating whether or not projector 2 is making a display from display presence/absence checking means 203, and returns projector information R-1 including the projector name, IP address and status, using search response means 201.

Search client 11 passes the received projector information to dialog display 15 for displaying the projector information on the screen.

Search response server 21, upon receipt of search command T-1, displays the IP address set for projector 2 on the screen using IP address display means 206. However, if projector 2 has already displayed an image, the IP address is not displayed.

Further, search response server 21 generates a preview image, which is a scale-down version of the image displayed on the screen by projector 2, based on the displayed IP address or an existing display using preview image generating means 207.

Afterwards, as projector 2 is selected on dialog display 15, search client 11 transmits image request command T-3 for requesting a preview image using preview image requesting means 109.

Search response server 21, upon receipt of image request command T-3, returns the generated preview image as image data R-3 using preview image transmitting means 209.

Search client 11 passes the received image data to dialog display 15 for displaying the preview on the screen.

A program for implementing the projector selecting method according to the second embodiment of the present invention can permit the computer and the search response server of the projector to execute the projector selecting method.

What is claimed is:

1. A projection system having two or more projectors and a computing system interconnected through a network with each other,
   each of said projectors comprises:
      a display presence/absence checker that determines whether the projector is projecting an image,
      an identifier display that displays a received assigned identifier of the projector if the display presence/absence checker determines that the projector is not projecting an image,
      a preview image generator that generates a preview image based on a projected image if the display presence/absence checker determines that the projector is projecting an image, and generates a preview image based on the displayed assigned identifier if the display presence/absence checker determines that the projector is not projecting an image, and
      a preview image transmitter that transmits said preview image to said computing system through said network; and
   said computing system comprises:
      a projector search section that acquires projector information including whether each of the two or more projectors is currently projecting an image,
      an identifier assigning section configured to transmit an identifier assignment to one or more of the two or more projectors, the identifier assigning section only transmitting the identifier to a projector not currently projecting an image,
      a preview image requesting section that receives said preview image from each of said two or more projectors through said network, and
      a dialog display section that, upon selection of a projector from a list, displays a corresponding preview image.

2. A projection system having two or more projectors and a computing system interconnected through a network with each other,
   each of said projectors comprises:
      display presence/absence checking means for determining whether the projector is projecting an image,
      identifier display means for displaying a received assigned identifier of the projector if the display presence/absence checking means determines that the projector is not projecting an image,
      preview image generation means for generating a preview image based on either a projected image or the displayed assigned identifier, and
      preview image transmitting means for transmitting said preview image to said computing system through said network; and
   said computing system comprises:
      projector search means for acquiring projector information including whether each of the two or more projectors is currently projecting an image,
      identifier assigning means for transmitting an identifier assignment to one or more of the two or more projectors, the identifier assigning means only transmitting the identifier to a projector not currently projecting an image,
      preview image requesting means for receiving said preview image from each of said two or more projectors through said network, and
      dialog display means for, upon selection of a projector from a list, displaying a corresponding preview image.

* * * * *